United States Patent Office 3,842,025
Patented Oct. 15, 1974

3,842,025
PROCESS FOR THE PREPARATION OF LOW-VISCOSITY, LOW-ODOROUS STYRENE/BUTADIENE POLYMER DISPERSIONS CONTAINING CARBOXYL GROUPS
Herbert Schlüter, Marl, Germany, assignor to Chemische Werke Huls AG, Marl, Germany
No Drawing. Continuation of abandoned application Ser. No. 106,908, Jan. 15, 1971. This application Apr. 9, 1973, Ser. No. 349,194
Claims priority, application Germany, Jan. 19, 1970, P 20 02 094.4
Int. Cl. C08f 27/08
U.S. Cl. 260—29.7 PT    12 Claims

ABSTRACT OF THE DISCLOSURE

Low-viscosity, low-odorous carboxyl group-containing vinyl-diolefin polymer dispersions containing 0.1–4.0% by weight of the total solids content of an emulsifier are produced by conducting the polymerization at a pH of 1.5 to 3.6 and at a temperature no greater than 100° C. and thereafter neutralizing from 10–70% of the carboxylic group present therein prior to agglomeration.

BACKGROUND OF THE INVENTION

This is a continuation of application Ser. No. 106,908, filed Jan. 15, 1971, and now abandoned.

This invention relates to a process for the preparation of low-viscosity, low-odorous aqueous dispersions of carboxyl group-containing vinyl-diolefin resins.

Synthetic resin dispersions employed heretofore have a serious drawback in that low-volatility substances which are formed as by-products during the polymerization emit a strong odor which impairs the usefulness of the dispersion as a coating mixture. Therefore, it is necessary to remove the undesired substances which include, for example, 4-phenylcyclohexene and other unidentified products which can be detected by gas chromatography and which are determinable with respect to the quantity thereof, in a time-consuming process subsequent to the polymerization, e.g., by water evaporation or steam distillation. However, these substances are considerably more difficult to remove from the dispersion by deodorizing methods than, for example, styrene, ethylbenzene, and similar residual hydrocarbons. Comparatively, a specific amount of steam or water vapor which can reduce the residual styrene content of the dispersion to 5–10% of the original amount, can attain at the most, a reduction of up to 80%, in the case of the strongly odorous products.

A process for preparing dispersions containing carboxyl groups having a more pleasant odor together with an improved viscosity is disclosed in German published application OS 1,495,428. In that process, the polymerization is initiated by raising the temperature after first dispersing at least part of the unsaturated acid and after the addition and dispersion of at least a portion of the diene and the monoalkylene-aromatic monomers, with the residual proportions of the monomers being added thereafter.

That process and similar methods wherein a dispersion having a low viscosity is obtained by special polymerization conditions have disadvantages, including a complicated and uneconomical mode of operation, prolonged polymerization times and/or higher polymerization temperatures, therefore the formation of odorous substances being enhanced. Furthermore, it is also necessary to adjust the dispersion to a specific acidic pH range in order to polymerize the unsaturated acids.

Accordingly, it is the primary object of this invention to produce vinyl-diolefin dispersions which are relatively free of odorous products. It is another object to produce low-viscosity and low-odorous dispersions in a simple and economical manner.

Other objects will be apparent to those skilled in the art to which this invention pertains.

SUMMARY OF THE INVENTION

Low-odor and low-viscosity vinyl-diolefin synthetic resin dispersions containing carboxyl groups in combination with an emulsifier are prepared by conducting the polymerization at a pH of 1.5–3.6 and at a temperature not greater than 100° C., thereafter neutralizing 10–70% of the carboxyl groups and then agglomerating the dispersion.

DEAILED DESCRIPTION OF THE INVENTION

The carboxyl-group-containing synthetic resin dispersions are obtained by the emulsion polymerization of a mixture of (a) a polymerizable diolefin, (b) a vinyl monomer, and (c) a polymerizable unsaturated acid.

The polymerizable diolefin can be any conjugated diene monomer conventionally employed to produce polymers and copolymers with vinyl monomers, including linear and cyclic diolefinic hydrocarbons and substituted hydrocarbons, e.g., substituted on one or both terminal carbon atoms with lower-alkyl, halogen or other non-inactivating group.

The vinyl monomer can be any activated vinyl compound conventionally employed to produce vinyl polymers, e.g., vinyl halides, vinyl ethers, e.g., vinyl alkyl ethers, vinyl esters, e.g., of lower-fatty acids, vinyl nitriles, vinyl amides, vinyl substituted aryl and heterocyclic aromatic compounds, e.g., wherein the aryl group is phenyl, biphenyl, naphthyl, alkylphenyl, e.g., methylphenyl, dimethylphenyl, ethylphenyl and isopropylphenyl, halophenyl, e.g., chlorophenyl, and α-alkyl substituted vinyl, e.g., α-methylvinylphenyl and the carbocyclic aromatic group is pyridyl, thiophyl, etc.

The unsaturated acid can be any acid having ethylenic unsaturation alpha to the carboxy group co-polymerizable with a vinyl or conjungated diene monomer, e.g., α-ethylenically unsaturated lower-fatty acids and substituted fatty acids and dicarboxylic acids, e.g., substituted in the α- and/or β-position with methyl, halogen or alkoxy.

Examples of polymerizable diolefins are butadiene-1.3 and substituted butadienes-1.3, e.g., 2-methylbutadiene-1.3 (isoprene), 2.3-dimethylbutadiene-1.3, piperylene, 2-chlorobutadiene - 1.3, 2 - cyanobutadiene-1,3; pentadienes and hexadienes.

Examples of vinyl monomers are styrene, vinyltoluene, α-methylstyrene, chlorostyrene, dichlorostyrene, vinylnaphthalene, acrylonitrile, acrylamide, vinylpyridine, vinylidenechloride.

Examples of unsaturated acid, acrylic acid, methacrylic acid, crotonic and isocrotonic acid, itaconic acid, fumaric acid, citraconic acid and mixtures thereof up to 50% of the unsaturated acid can be replaced with the corresponding ester thereof, e.g., an ester of an alcohol containing 1–9 carbon atoms, e.g., methyl or ethyl ester.

The proportion of the diolefin component is usually about 20–80%, preferably about 30–70% of the monomer mixture employed for the polymerization. The proportion of the acid component is generally about 0.5–8%, and preferably about 1.5–5%.

The proportion of vinyl monomer generally present in the starting monomer mixture is generally about 15 to 80%, preferably about 25 to 70%.

The emulsifier component can be any emulsifier conventionally employed in emulsion polymerizations. Preferred are the ionic surfactants. Examples of suitable emulsifiers include sulfoxidized paraffins, with alkylsulfonic acids wherein the alkyl group contains 8–12 carbon atoms being particularly preferred. Alkylarylsulfonic acids, e.g., dodecyl-benzenesulfonic acid, and other conventional ionic emulsifiers also form dispersions within the desired acidic pH range.

The dispersions of this invention contain from 0.1–4.0%, preferably from 0.5–3.0%, of the above-mentioned emulsifiers, based on the total solids content.

Electrolytes are contained in the latices of the emulsified monomers generally in amounts sufficient to be effective as polymerization adjuvants, e.g., as polymerization catalysts. Examples include the persulfates and decomposition products thereof; salts of hyposulfurous acid, which are conventionally employed as reducing agents during the redox-type polymerization; and complex-forming agents, e.g., salts of ethylenediaminetetraacetic acid. These additives are normally employed in amounts of up to 0.5%, based on the weight of the mixture of monomers.

The carboxyl-group-containing synthetic resin dispersions employed in the process of this invention exhibit, after the polymerization, a solids content of between 30 and 55%.

The polymerization is conducted at a temperature of up to 100° C., e.g., between 5 and 100° C., and preferably less than 80° C.

The polymerization is conducted at an initial pH of 1.5–3.6, preferably about 2.3. Ordinarily, it is not necessary for the pH to be adjusted prior to the polymerization. The pH is by necessity determined by the unsaturated carboxylic acid employed. However, it is also possible to vary the pH by adding small amounts of a mineral avid, for example, $H_2SO_4$, HCl or bases, for example, $NH_3$, sodium hydroxide, potassium hydroxide, within the indicated pH range, so that advantages can be obtained thereby, e.g., an improvement in the viscosity of the dispersion after the polymerization.

In order to produce the dispersions of this invention, it is not necessary to take special steps in order to lower the viscosity, e.g., by the preparation of a primary emulsion, adding the emulsifier and/or the monomers in metered quantities, increasing the pH to above 3.6, increasing the amount of the polymerization catalyst in conjunction with the use of nonionic emulsifiers, and similar steps. Instead, the unique process of this invention makes it possible to adjust the viscosity of the dispersion merely by the setting of a specific degree of partial neutralization within the scope of this invention over a wide range and to higher or lower values depending on the purpose for which it is later employed. By controlling the agglomeration in accordance with the present process, the formation of gels and coagulates can be avoided or circumvented, a particular advantage since it is desired to obtain polymerization products with lower viscosities by the polymerization conditions of this invention.

In order to prepare the dispersion, a pressure-resistant agitator-equipped kettle can be employed, preferably one provided with a cooling jacket or other conventional cooling system for removing the heat of polymerization. The polymerization kettle, after evacuation and nitrogen purging, is then filled in a conventional manner with an emulsifier and the monomers. Then, the emulsion polymerization is initiated by adding an activator or initiator and elevating the temperature of the mixture. The polymerization is ordinarily conducted so as to achieve 100% conversion, but can be interrupted before there is a complete conversion, for example at 60–80% of completion. When the monomers have only been partially converted into the desired polymer, the partial neutralization and the agglomeration steps are conducted in the presence of the residual monomeric hydrocarbons. When the polymerization is completed, the partial neutralization of the resulting terpolymer is then effected with base, usually $NH_3$.

Thereafter, the agglomeration step is conducted in a conventional manner. The resulting polymer dispersion contains in significant amounts as impurities only those residual hydrocarbons which are readily removed during the concentration of the dispersion. Thus, special deodorizing processes necessitating the use of a column and the introduction of steam into the polymerization kettle is not necessary.

When the polymerization is carried out in the pH range of this invention, highly viscous dispersions are obtained within a short period of time and generally within 6–12 hours. These dispersions cannot ordinarily be directly employed because of their high solids content of about 46–49% and their correspondingly high viscosity of about 1200 centipoises (measured by means of a Brookfield viscosimeter, spindle 3, 30 r.p.m.). These dispersions have a viscosity far beyond the viscosity range necessary for the processing thereof.

Accordingly, it is therefore necessary to reduce the viscosity of the dispersion in a subsequent treatment. For this purpose, between about 10–70%, and preferably between about 15–55%, of the carboxyl groups present in the terpolymer are neutralized. Ordinarily, the viscosity of a dispersion containing, for example, 50% by weight of solids, must be below 400 cp. in order for the dispersion to be satisfactorily processed.

Aqueous ammonia solution is usually employed as the neutralizing agent since ammonia can readily be removed during the later processing. However, it is also possible to employ other neutralizers, e.g., inorganic bases, including solutions of sodium hydroxide or potassium hydroxide, etc. The optimum degree of partial neutralization of a specific dispersion can easily be determined by preliminary experiments. For this purpose, samples can be withdrawn and mixed with varying amounts of the neutralization agent and then agglomerated.

The maximum agglomeration of the latex particles is indicated by the highest decrease in surface tension. Such decrease can be up to 20 dyn./cm.

The agglomeration is conducted by conventional methods, particularly by so-called chemical agglomeration, e.g., with the aid of oxidized polyethylene oxides, but is not limited to this method. The oxidized polyethylene oxides generally have a molecular weight of about 3,000 to 30,000 preferably about 3,000 to 12,000. The oxidized polyethylene oxides are generally employed in effective amounts, e.g., and generally between 0.01% and 2% and preferably between 0.05% and 1% by weight of the total solids contents of the polymer dispersion.

The agglomeration step will be described by way of example with the use of such a chemical agglomerating agent. The partially neutralized, carboxyl-group-containing synthetic rubber dispersion is agglomerated, after the addition of an agglomerating agent, as an aqueous solution at a temperature of between 15 and 100° C., preferably about 30 to 60° C. Thereafter, the carboxyl groups are completely neutralized by raising the pH to 8.5–9.

The synthetic rubber dispersions containing carboxyl groups can be concentrated, according to the predetermined particle size and particle size distribution, to solids contents of about 53–65%, at a viscosity of 1200 cp., for example by evaporation under vacuum and under agitation, at temperatures of between 20 and 60° C. During this procedure, the dispersions retain the fluidity necessary for the further processing thereof.

The carboxyl-group-containing styrene-butadiene synthetic resin dispersions produced in accordance with this invention are practically odor-free. 4-Phenylcyclohexene was mainly identified as the malodorous substance. Other strongly odorous substances could not yet be determined with respect to their composition. However, they can be determined by gas chromatography. It has been found that the lower the pH during the polymerization, the lower the proportion of malodorous substance present in the dispersion. For example, the amount of 4-phenylcyclohexene present in a dispersion polymerized at 60° C. and at a pH of 2.7 and containing acrylic acid and 40% of butadiene is 38 p.p.m.; 48 p.p.m. in a dispersion produced at a pH of 3.3; and 64 p.p.m. in a dispersion produced at a pH of 3.6. When the pH is outside the range of this invention, e.g., dispersions produced at a pH of 4.0, more than 200 p.p.m. of 4-phenylcyclohexene are present in the dispersion.

The dispersions produced in accordance with the process of this invention can thus be employed as coating materials for paper, carpets, and similar articles and in all those cases where the otherwise strong odor of the prior dispersions would normall interfere with their use.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

As part of an experimental series several dispersions are produced wherein, except for one sample, the initial pH of the mixtures of monomers prior to polymerization of 2.7 is adjusted, using sulfuric acid and ammonia, to 1.5; 3.0; 3.6; 4.0; and 5.0, respectively.

The respective dispersions are obtained by polymerizing at 60° C., 40 parts by weight of butadiene, 57.5 parts by weight of styrene, and 2.5 parts by weight of acrylic acid, in the presence of 0.2 part by weight of potassium persulfate and 138 parts by weight of deionized water, 3.0 parts by weight of a $C_8$–$C_{12}$ paraffin sulfonate, and 0.5 part by weight of dodecyl mercaptan, with a solids content of 43.6%. The results obtained are set forth in Table 1.

The dispersions within the pH range of this invention are then subjected to a partial neutralization with varying amounts of a 10% aqueous ammonia solution. The individual samples are then agglomerated with oxidized polyethylene oxide (molecular weight: 6000; 0.1 part by weight per 100 parts by weight of solids) at 60° C. for 1–2 hours. An optimum solids content of 58% (Table 1, Experiment 2) is obtained at a degree of partial neutralization of 35%, corresponding to a reduction in surface tension of 18 dyn./cm. as can be seen from Table 2.

TABLE 2

| Degree of partial neutralization in percent of COOH-groups: | Solids content in percent after agglomeration and concentration to 1,200 cp. |
|---|---|
| 0 | 49.0 |
| 5 | 51.0 |
| 10 | 52.5 |
| 15 | 53.0 |
| 20 | 53.2 |
| 25 | 55.0 |
| 30 | 56.8 |
| 35 | 58.0 |
| 40 | 57.5 |
| 45 | 56.5 |
| 50 | 55.6 |
| 55 | 54.3 |
| 60 | 53.5 |
| 65 | 53.0 |
| 70 | 52.5 |
| 80 | 50.9 |
| 90 | 49.5 |
| 100 | 48.0 |

EXAMPLE 2

A polymerization charge containing 0.5 part by weight of potassium persulfate, 40 parts by weight of butadiene, 51.5 parts by weight of styrene, and 2.5 parts by weight of acrylic acid in the presence of 190 parts by weight of deionized water, 0.5 part by weight of a $C_8$–$C_{12}$ paraffin sulfonate, and 0.5 part by weight of dodecyl mercaptan is polymerized at 60° C. A latex is obtained having a solids content of 35.0%. The polymerization charge exhibits an initial pH of 2.7 and after polymerization, a pH of 4.05. The viscosity after the polymerization is 140 cp. The dispersion can be concentrated to a solids content of 47% by evaporation in accordance with conventional methods. The content of malodorous substances is 40 p.p.m.

For processing the dispersion in accordance with the invention, a partial neutralization is carried out with varying amounts of aqueous dilute ammonia solution. The individual polymerized samples are then agglomerated as described in Example 1 by adding 0.2% oxidized polyethyleneoxide. By the partial neutralization of up to 49% of the carboxyl groups, the solids content can be increased to 55%, at a viscosity of 1200 cp. During this process, the surface tension is reduced by 11 dyn./cm.

For comparison, a latex is produced having the same emulsifier content but is polymerized at an initial pH of 5.0. The dispersion exhibits a viscosity of 120 cp. at 50% solids after the polymerization and can be concentrated, without agglomeration, to 58% and 1200 cp. However, the content of malodorous substance is 262 p.p.m.

EXAMPLE 3

A polymerization charge containing 0.2 part by weight of potassium persulfate, 40 parts by weight of butadiene, 48 parts by weight of styrene, and 2.0 parts by weight of

TABLE 1

| Experiment number | pH value Prior to polymerization | pH value After polymerization | Solids content at a viscosity of 1,200 cp. (percent) | Surface tension (dyn/cm.) | Polymerization time (hrs.) | Content of malodorous substance (p.p.m.) | Odor of a carpet coating | Degree of partial neutralization (percent) | Solids content after concentrating wherein viscosity is 1,200 cp. (percent) |
|---|---|---|---|---|---|---|---|---|---|
| 1 | 1.5 | 2.4 | 48 | 52.2 | 10 | 50 | Good | 37.0 | 57.0 |
| 2 | 2.7 | 3.9 | 46 | 55.0 | 7 | 38 | Very good | 35.0 | 58.0 |
| 3 | 3.0 | 4.3 | 46.5 | 52.9 | 9 | 48 | Good | 36.0 | 56.0 |
| 4 | 3.6 | 4.8 | 49.2 | 53.1 | 11.5 | 61 | do | 34.0 | 57.0 |
| 5 | *4.0 | 5.1 | 53.0 | 32.7 | 23 | 220 | Bad | | 58.0 |
| 6 | *5.0 | 6.0 | 60.0 | 34.1 | 31 | 280 | Bad | | 59.5 |

*Not produced in accordance with the present invention.

fumaric acid in the presence of 138 parts by weight of deionized water, 3.0 parts by weight of a $C_8$–$C_{12}$ paraffin sulfonate, and 0.5 part by weight of dodecyl mercaptan, is subjected to a polymerization reaction at 60° C. A dispersion is obtained containing 43.6% by weight of solids. The polymerization mixture has an initial pH of 2.3 and after the polymerization, a pH of 2.65. The viscosity is 70 cp. The dispersion can be concentrated to a 47% solids content at 1200 cp. when evaporated in accordance with conventional methods.

In order to form the dispersion in accordance with this invention, it is then subjected to a partial neutralization with varying amounts of aqueous dilute ammonia solution. The individual samples are agglomerated as described in Example 1. By conducting the partial neutralization to a pH of 6.5, the solids content of the dispersion can now be increased to 56% at 1200 cp.

For purposes of comparison, a corresponding dispersion, containing fumaric acid, was produced with an initial pH of 5.0. The dispersion could be concentrated up to 58% without agglomeration.

Both dispersions were employed for the production of a carpet coating. The odor of the carpet coating with the partially neutralized and agglomerated dispersion produced according to this invention was not objectionable, whereas the dispersion which was not prepared according to the invention exhibited a strong odor which could not be removed, even by heating the carpet for a long period of time.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of a polymer by polymerizing in an aqueous dispersion a monomeric mixture consisting essentially of on a weight percent basis, 20–80 of a conjugated diolefin, 15–80 of a vinyl monomer, and 0.5–8 of a carboxylic acid having ethylenic unsaturation $\alpha$ to the carboxy group and copolymerizable with the vinyl or conjugated diene monomer, said polymerization being conducted at an initial pH of about 1.5–3.6 and at a temperature no greater than 100° C., and thereafter raising the pH of the polymer dispersion by the addition of a base thereto, the improvement which comprises conducting the polymerization for 6–12 hours, after the polymerization, neutralizing from 15–55% only of the carboxyl group of the thus produced polymer with the base, and then agglomerating the dispersion of partially neutralized polymer, thereby producing a relatively odorless, low viscosity aqueous polymeric dispersion.

2. A process according to claim 1 wherein the initial pH is about 2–3.

3. A process according to claim 1 wherein the polymerization is conducted at a temperature not exceeding 80° C.

4. A process according to claim 3 wherein the initial pH is about 2–3.

5. A process according to claim 1 wherein the vinyl monomer is a styrene.

6. A process according to claim 1 wherein the conjugated diolefin is butadiene.

7. A process according to claim 1 wherein the polymer comprises styrene and butadiene and the polymerization is conducted at an initial pH of about 2–3 and at a temperature not exceeding 80° C.

8. A process according to claim 1 wherein the polymerization is conducted in the presence of 0.1 to 4% of an emulsifier.

9. A process according to claim 8 wherein the emulsifier is a sulfoxidized paraffin containing 8–12 carbon atoms.

10. A process according to claim 1 wherein the polymerization is conducted in the presence of 0.1–0.5 by weight, based on the monomers employed, of a polymerization activator.

11. A process according to claim 1 which comprises agglomerating the partially neutralized polymer with an oxidized polyethylene oxide having a molecular weight of about 3,000–30,000.

12. A process as defined by claim 1 wherein the proportion of the diolefin is 30–70, vinyl monomer 25–70, and the carboxylic acid 1.5–5% by weight.

References Cited

UNITED STATES PATENTS

| | | | |
|---|---|---|---|
| 3,330,795 | 7/1967 | Schlüter | 260—29.7 |
| 3,409,569 | 11/1968 | Lane et al. | 260—29.7 H |
| 3,554,888 | 1/1971 | Seitz | 260—29.7 H |
| 3,637,565 | 1/1972 | Sheetz | 260—29.7 H |

ALLAN LIEBERMAN, Primary Examiner

T. DE BENEDICTIS, SR., Assistant Examiner

U.S. Cl. X.R.

260—29.7 H, AT, SQ, 80.7, 96 R